(12) United States Patent
Takasaki et al.

(10) Patent No.: US 8,787,722 B2
(45) Date of Patent: Jul. 22, 2014

(54) OPTICAL WAVEGUIDE

(75) Inventors: Toshihiko Takasaki, Ibaraki (JP); Masatoshi Yamaguchi, Ibaraki (JP); Toshihiro Kuroda, Ibaraki (JP); Tatsuya Makino, Ibaraki (JP); Masami Ochiai, Ibaraki (JP); Atsushi Takahashi, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 503 days.

(21) Appl. No.: 13/119,800

(22) PCT Filed: Sep. 18, 2009

(86) PCT No.: PCT/JP2009/066335
§ 371 (c)(1), (2), (4) Date: Jul. 7, 2011

(87) PCT Pub. No.: WO2010/032809
PCT Pub. Date: Mar. 25, 2010

(65) Prior Publication Data
US 2011/0262091 A1    Oct. 27, 2011

(30) Foreign Application Priority Data
Sep. 19, 2008 (JP) .................. 2008-241330

(51) Int. Cl.
*G02B 6/10*     (2006.01)
*G02B 6/122*    (2006.01)
*G02B 6/125*    (2006.01)
*B29D 11/00*    (2006.01)
*B29L 11/00*    (2006.01)

(52) U.S. Cl.
CPC .............. *G02B 6/1221* (2013.01); *G02B 6/122* (2013.01); *G02B 6/125* (2013.01); *B29L 2011/0075* (2013.01); *B29D 11/00663* (2013.01); *B29D 11/00673* (2013.01)
USPC ........................... 385/132; 385/131; 264/1.24

(58) Field of Classification Search
USPC .................. 385/129–132, 141–145; 522/183; 156/60, 272.2; 264/1.24–1.29
See application file for complete search history.

(56) References Cited

U.S. PATENT DOCUMENTS 3,968,198 A * 7/1976 Honda et al. .................. 264/343
4,173,556 A * 11/1979 Coran et al. .................. 524/169
(Continued)

FOREIGN PATENT DOCUMENTS

JP    2006-259361 A    9/2006
JP    3870976          10/2006
(Continued)

OTHER PUBLICATIONS

International Search Report of Appln. No. PCT/JP2009/066335 dated Oct. 20, 2009.

*Primary Examiner* — Uyen Chau N Le
*Assistant Examiner* — Michael Mooney
(74) *Attorney, Agent, or Firm* — Antonelli, Terry, Stout & Kraus, LLP.

(57) ABSTRACT

An optical waveguide contains a lower cladding layer, a patterned core layer, an upper cladding layer and an upper low elasticity layer, which are laminated in this order, in which a film formed by curing a resin composition for forming the upper low elasticity layer has a tensile elastic modulus of from 1 to 2,000 MPa at 25° C., and a cured film having a thickness of 110 μm formed by curing a resin composition for forming the upper cladding layer has a total light transmittance of 90% or more. An optical waveguide that has good flexural resistance and good optical characteristics can be provided.

19 Claims, 1 Drawing Sheet

(56) References Cited

U.S. PATENT DOCUMENTS

| | | | |
|---|---|---|---|
| 7,489,521 B2 * | 2/2009 | Kariya et al. | 361/795 |
| 7,496,266 B2 | 2/2009 | Enami et al. | |
| 7,751,678 B2 * | 7/2010 | Shibata et al. | 385/141 |
| 2005/0185880 A1 * | 8/2005 | Asai | 385/14 |
| 2008/0260341 A1 | 10/2008 | Shibata | |
| 2009/0175585 A1 | 7/2009 | Makino et al. | |
| 2009/0196562 A1 | 8/2009 | Ishida et al. | |

FOREIGN PATENT DOCUMENTS

| | | |
|---|---|---|
| JP | 3906870 | 1/2007 |
| WO | WO 2006/038691 A1 | 4/2006 |
| WO | WO 2007/091596 A1 | 8/2007 |

\* cited by examiner

OPTICAL WAVEGUIDE

This application is a national stage application filed under 35 USC 371 of PCT/JP2009/066335 which has the international filing date of Sep. 18, 2009 and claims the benefit of foreign priority to JP 2008-241330 filed Sep. 19, 2008.

TECHNICAL FIELD

The present invention relates to an optical waveguide, and more specifically, a flexible optical waveguide that has high flexural resistance and is excellent in optical characteristics.

BACKGROUND ART

In high-speed and high-density signal transmission among electronic devices and among wiring boards, there are coming limitations in increase of transmission speed and density due to mutual interference and attenuation of signals as barriers in the conventional transmission by an electric wire. For overcoming the barriers, a technique of connecting among electronic devices and among wiring boards with light, i.e., a so-called optical interconnection, is being investigated.

A flexible film optical waveguide is demanded for transmitting an optical signal within a short distance inside a device or between devices. In the case where an optical waveguide is disposed inside a portable small-sized device, in particular, there are many cases where an optical waveguide is disposed to follow the surfaces of the parts for saving the space, and thus a polymer film optical waveguide that can be flexed with a small curvature radius is demanded.

An optical waveguide using a material having a low elastic modulus is developed for enhancing the bendability and the followability to the interface upon shape restoration of the optical waveguide. For example, Patent Documents 1 and 2 propose an optical waveguide with high flexural resistance and twist resistance having a flexural elastic modulus of the optical waveguide of 1,000 MPa or less and a thickness thereof of 150 μm or less. However, the optical waveguide is produced with a stamper, and there are defects of low degree of freedom in design and difficulty in design change.
[Patent Document 1] Japanese Patent No. 3,870,976
[Patent Document 2] Japanese Patent No. 3,906,870

DISCLOSURE OF THE INVENTION

In addition to the problems described above, it has been clarified by the inventors that an optical waveguide using an elastomer as a cladding layer, which is disclosed in Patent Documents 1 and 2, suffers increase of optical transmission loss in the core layer due to the low total light transmittance of the cladding layer. In view of the problems described above, an object of the present invention is to provide an optical waveguide that has high flexural resistance and is excellent in optical characteristics.

As a result of earnest investigations by made by the inventors, it has been found that the problems are resolved by an optical waveguide containing a lower cladding layer, a patterned core layer and an upper cladding layer, in which a low elasticity layer having particular properties is further disposed on the upper cladding layer.

The present invention thus relates to an optical waveguide containing a lower cladding layer, a patterned core layer, an upper cladding layer and an upper low elasticity layer, which are laminated in this order, a film formed by curing a resin composition for forming the upper low elasticity layer having a tensile elastic modulus of from 1 to 2,000 MPa at 25° C., and a cured film having a thickness of 110 μm formed by curing a resin composition for forming the upper low elasticity layer having a total light transmittance of 90% or more.

According to the present invention, an optical waveguide that has high flexural resistance and is excellent in optical characteristics is provided.

| [Description of the Symbols] | |
| --- | --- |
| 1 | optical waveguide |
| 2 | substrate |
| 3 | lower low elasticity layer |
| 4 | lower cladding layer |
| 5 | upper cladding layer |
| 6 | upper low elasticity layer |
| 7 | core pattern |

BEST MODE FOR CARRYING OUT THE INVENTION

Figure 1:
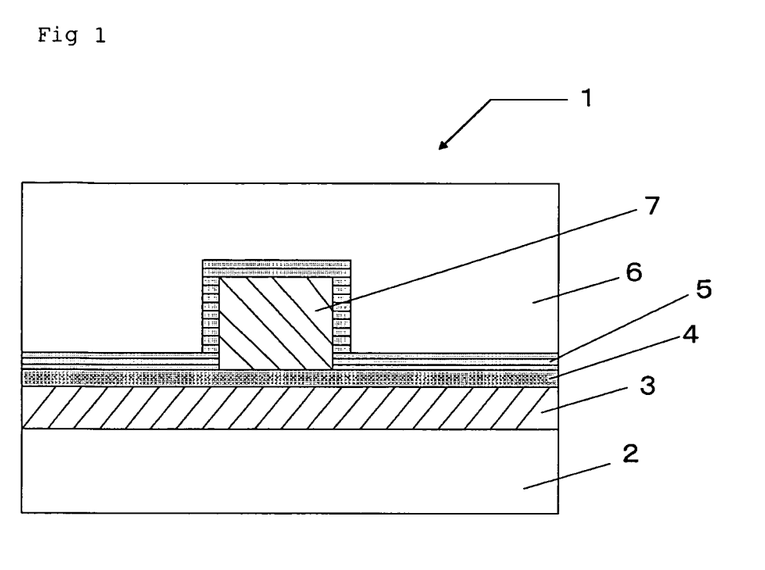
FIG. 1 The figure is a schematic illustration showing an optical waveguide according to the present invention.

An optical waveguide according to the present invention will be described with reference to FIG. 1. The optical waveguide 1 of the present invention has a structure containing a lower cladding layer 4, a patterned core layer 7, an upper cladding layer 5 and an upper low elasticity layer 6, which are laminated in this order. Preferably, the optical waveguide has a lower low elasticity layer 3 and thus has a structure containing a lower low elasticity layer 3, a lower cladding layer 4, a patterned core layer 7, an upper cladding layer 5 and an upper low elasticity layer 6, which are laminated in this order. FIG. 1 shows a structure, in which the optical waveguide having the above structure is laminated on a substrate 2, but the present invention is not limited to the structure, and a structure, in which the substrate is disposed on the side of the upper low elasticity layer 6, may be employed.

The substrate 2 may preferably be a polymer film for imparting flexibility, plasticity and toughness to the optical waveguide.

The material constituting the polymer film is not particularly limited, and preferred examples thereof include polyester, such as polyethylene terephthalate, polybutylene terephthalate and polyethylene naphthalate, and also include polyethylene, polypropylene, polyamide, polycarbonate, polyphenylene ether, polyether sulfide, polyarylate, a liquid crystal polymer, polysulfone, polyether sulfone, polyether ether ketone, polyether imide, polyamide imide and polyimide, since the materials have plasticity and toughness.

The thickness of the substrate 2 is not particularly limited, and is generally in a range of from 5 to 50 μm, preferably in a range of from 10 to 40 μm, and more preferably in a range of from 15 to 30 μm.

A resin composition for forming the lower cladding layer 4 is not particularly limited as far as the resin composition has a lower refractive index than the core layer and is cured with light, and a photosensitive resin composition may be used.

More preferably, the resin for forming the cladding layer is constituted by a resin composition containing (A) a base polymer, (B) a photopolymerizable compound and (C) a photopolymerization initiator.

The base polymer (A) used herein is for forming the cladding layer and ensuring the strength of the cladding layer, and is not particularly limited as far as these objects are satisfied. Examples thereof include a phenoxy resin, a (meth)acrylic resin, a polycarbonate resin, a polyarylate resin, polyether amide, polyether imide, polyether sulfone and derivatives thereof. The base polymer may be used solely or as a mixture of two or more thereof. Among the base polymers described above, ones having an aromatic skeleton on the main chain are preferred since they have high heat resistance, and a phenoxy resin is particularly preferred.

The compatibility with the photopolymerizable compound (B) described later is important for ensuring transparency of the resin film for forming the cladding layer, and a phenoxy resin and a (meth)acrylic resin are preferred in this point of view. The (meth) acrylic resin herein means an acrylic resin and a methacrylic resin.

In the phenoxy resin, ones containing as constitutional components bisphenol A, a bisphenol A type epoxy compound or a derivative thereof, and bisphenol F, a bisphenol F type epoxy compound or a derivative thereof are preferred since they are excellent in heat resistance, adhesiveness and compatibility. Preferred examples of the derivative of bisphenol A or a bisphenol A type epoxy compound include tetrabromobisphenol A and a tetrabromobisphenol A type epoxy compound.

Preferred examples of the derivative of bisphenol F or a bisphenol F type epoxy compound include tetrabromobisphenol F and a tetrabromobisphenol F type epoxy compound. Specific examples of a bisphenol A-bisphenol F copolymer type phenoxy resin include "Phenotohto YP-70", a trade name, produced by Tohto Kasei Co., Ltd.

The photopolymerizable compound (B) is not particularly limited as far as it is polymerized through irradiation of light, such as an ultraviolet ray, and examples thereof include a compound having two epoxy groups in the molecule and a compound having an ethylenic unsaturated group in the molecule.

Examples of the epoxy resin include a bisphenol A type epoxy resin, such as "Epotohto YD-7020", "Epotohto YD-7019" and "Epotohto YD-7017", trade names, produced by Tohto Kagaku Co., Ltd., and "Epikote 1010", "Epikote 1009" and "Epikote 1008", trade names, produced by Japan Epoxy Resin Co., Ltd., and an alicyclic epoxy resin, such as "KRM-2110", produced by ADEKA Corporation.

The photopolymerization initiator as the component (C) is not particularly limited, and for example, examples of an initiator for an epoxy compound include an aryl diazonium salt, a diaryliodonium salt, a triarylsulfonium salt, a triallylselenonium salt, a dialkylphenazylsulfonium salt, a dialkyl-4-hydroxyphenylsulfonium salt and a sulfonate ester.

Examples of an initiator for a compound having an ethylenic unsaturated group in the molecule include an aromatic ketone, such as benzophenone, a quinone compound, such as 2-ethylanthraquinone, a benzoin ether compound, such as benzoin methyl ether, a benzonin compound, such as benzoin, a benzyl derivative, such as benzyl dimethyl ketal, a 2,4,5-triarylimidazole dimer, such as 2-(o-chlorophenyl)-4,5-diphenylimidazole dimer, a phosphine oxide compound, such as bis(2,4,6-trimethylbenzoyl)phenylphosphine oxide, an acridine derivative, such as 9-phenylacridine, N-phenylglycine, an N-phenylglycine derivative, and a coumarin compound.

A thioxanthone compound and a tertiary amine compound may be combined, such as a combination of diethylthioxanthone and dimethylaminobenzoic acid. Among the above compounds, an aromatic ketone and a phosphine oxide compound are preferred for enhancing the transparency of the core layer and the cladding layer.

The photopolymerization initiator (C) may be used solely or as a mixture of two or more thereof.

Furthermore, the resin for forming the cladding layer of the present invention may contain so-called additives, such as an antioxidant, a yellowing preventing agent, an ultraviolet ray absorbent, a visible ray absorbent, a colorant, a plasticizer, a stabilizer and a filler, in such a ratio that does not impair the advantages of the present invention.

The preferred range of the thickness of the lower cladding layer 4 varies between the case where the lower low elasticity layer 3 described later is formed and the case where the lower low elasticity layer 3 is not formed. In the case where the lower low elasticity layer 3 is formed, the thickness is preferably in a range of from 3 to 20 μm in terms of an average thickness after drying. When the thickness is 3 μm or more, the thickness of the cladding layer necessary for containment of light can be ensured, and when it is 20 μm or less, the advantage of the lower low elasticity layer 3 described later can be sufficiently exerted, thereby providing sufficient plasticity. The thickness of the lower cladding layer 4 is more preferably in a range of from 3 to 10 μm from these points of view.

In the case where the lower low elasticity layer 3 is not formed, the thickness is preferably in a range of from 3 to 500 μm. When the thickness is 3 μm or more, the thickness of the cladding layer necessary for containment of light can be ensured, and when it is 500 μm or less, the thickness of the film can be easily controlled uniform. The thickness of the cladding layer 4 is more preferably in a range of from 3 to 100 μm from these points of view.

A cured film formed by polymerizing and curing a resin composition for forming the lower cladding layer preferably has a refractive index of from 1.400 to 1.700 at a wavelength of 830 nm and a temperature of 25° C. When the refractive index is from 1.400 to 1.700, the refractive index is not largely different from that of an ordinary optical resin, and thus the versatility as an optical material is not impaired. The refractive index of the cured film is more preferably from 1.425 to 1.675, and particularly preferably from 1.450 to 1.650, from these points of view.

A resin composition for forming the core layer 7 used may be a resin composition that provides a core layer 7 having a higher refractive index than the cladding layers 4 and 5 and can form a core pattern with active light, and a photosensitive resin composition is preferred therefor. Specifically, a resin composition that is similar to the resin composition for forming the lower cladding layer may be preferably used. That is, the resin composition may contain the components (A), (B) and (C), and may optionally contain the arbitrary components.

The thickness of the core layer is generally controlled to from 20 to 100 μm after drying. When the thickness of the core layer is 20 μm or more, that the positional tolerance on coupling with a light receiving/emitting device or an optical fiber after forming the optical waveguide can be advantageously enhanced, and when the thickness is 100 μm or less, the coupling efficiency is advantageously enhanced. The thickness of the core layer is more preferably in a range of from 30 to 70 μm from these points of view.

A resin composition for forming the upper cladding layer used may be preferably a resin composition that is similar to the resin composition for forming the lower cladding layer. The resin compositions for forming the upper cladding layer and the lower cladding layer may be the same as or different from each other, and the same resin composition is preferably used from the standpoint of adhesiveness and production efficiency.

The thickness of the upper cladding layer is preferably in a range of from 3 to 20 μm in terms of an average thickness after drying. When the thickness is 3 μm or more, the thickness of the cladding layer necessary for containment of light can be ensured, and when it is 20 μm or less, the advantages of the upper low elasticity layer 6 can be sufficiently exerted, which imparts sufficient plasticity to the optical waveguide. In general, the upper cladding layer is formed to be thick for embedding the core pattern, and in the present invention, the upper cladding is disposed to surround the periphery of the core pattern as shown in FIG. 1.

A cured film formed by polymerizing and curing a resin composition for forming the upper cladding layer preferably has a refractive index at a wavelength of 830 nm and a temperature of 25° C. that is similar to that of the lower cladding layer.

The optical waveguide of the present invention preferably has a relative refractive index difference between the core part and the cladding layer of from 1 to 10%. When the difference is 1% or more, light transmitted in the core part is not leaked to the cladding layer upon flexing. When it is 10% or less, the transmitted light is not diffused too much at a coupling part of the optical waveguide and an optical fiber or the like, thereby preventing the coupling loss from being increased. The relative refractive index difference between the core part and the cladding layer is more preferably from 1.5 to 7.5%, and particularly preferably from 2 to 7%, from these points of view. The relative refractive index difference is obtained according to the expression shown below.

relative refractive index difference(%)=[(refractive index of core part)$^2$−(refractive index of cladding part)$^2$]/[2×(refractive index of core part)$^2$]×100

One of the characteristic features of the optical waveguide of the present invention is the upper low elasticity layer 6 provided on the upper cladding layer. The upper low elasticity layer 6 necessarily has such a feature that a film formed by curing a resin composition for forming the upper low elasticity layer has a tensile elastic modulus of from 1 to 2,000 MPa at 25° C. When the tensile elastic modulus is 1 MPa or more, the cured film restores the original shape but is not extended out upon performing a flexing test or a twisting test. When the tensile elastic modulus is 2,000 MPa or less, the film can be flexed in the thickness direction with a small curvature radius. The tensile elastic modulus is more preferably from 10 to 1,000 MPa, and further preferably from 20 to 700 MPa, from these points of view.

Besides, the tensile elastic modulus is measured by a method as follows.

Tensile Elastic Modulus

A tensile test (chuck distance: 50 mm) of a resulting cured film (width: 10 mm, length: 70 mm) is performed with a tensile tester (RTM-100, produced by Orientec Co., Ltd.) at a temperature of 25° C. and a tensile rate of 50 mm/min according to JIS K 7127. The tensile elastic modulus is calculated by using the initial linear part of the tensile stress-distortion curve according to the expression shown below.

tensile elastic modulus(MPa)=(difference in stress between two points on straight line)(N)/(original average cross sectional area of cured film)(mm$^2$)/(difference in distortion between the same two points)

The tensile yield elongation on the tensile test of a cured film of a resin composition for forming the upper low elasticity layer is preferably from 5 to 600%. When the tensile yield elongation is 5% or more, the film is favorably not broken due to brittleness upon flexing. When the tensile yield elongation is 600% or less, the cured film is favorably not easily elongated on a flexing test, thereby preventing failure of restoration to the original shape. The tensile yield elongation is more preferably from 6 to 400%, and further preferably from 7 to 200%, from these points of view.

The upper low elasticity layer absorbs a mechanical tensile force applied thereto, whereby the deformation of the core can be decreased, and the transmission characteristics of the optical waveguide can be prevented from being deteriorated. The tensile yield elongation means an elongation at the time when the film is yielded in a film tensile test, and specifically is calculated according to the following manner.

Tensile Yield Elongation

The tensile yield elongation is calculated according to the expression shown below.

tensile yield elongation(%)=((chuck distance on starting plastic deformation)(mm)−(initial chuck distance) (mm))/(initial chuck distance)(mm)×100

The thickness of the upper low elasticity layer is preferably in a range of from 5 to 100 μm in terms of an average thickness after drying. When the thickness is 5 μm or more, the optical waveguide can easily have high toughness, and when it is 100 μm or less, the advantages of the upper low elasticity layer 6 can be sufficiently exerted, which imparts sufficient plasticity to the optical waveguide.

In the optical waveguide of the present invention, a cured film having a thickness of 110 μm formed by curing a resin composition for forming the upper cladding layer has a total light transmittance of 90% or more. When the total light transmittance is 90% or more, favorable optical characteristics can be maintained since the cladding layer disposed around the patterned core layer has high transparency. Accordingly, the aforementioned structure enables an optical waveguide that has plasticity and has high optical characteristics.

The total light transmittance may be measured in the following manner.

Total Light Transmittance

A resulting cured film (width: 30 mm, length: 30 mm) is measured for total light transmittance with a colorimeter (300A, produced by Nippon Denshoku Industries Co., Ltd.) at a temperature of 25° C. according to JIS K 7105.

The term "curing" in the present invention means such a state that a film is cured through sufficient reaction of the polymerizable group, such as an epoxy group and an ethylenic unsaturated group, with heat, active light or both of them.

The lower low elasticity layer 3 preferably has such a feature that a film formed by curing a resin composition for forming the lower low elasticity layer has a tensile elastic modulus of from 1 to 2,000 MPa at 25° C. When the tensile elastic modulus is 1 MPa or more, the cured film restores the original shape but is not extended out upon performing a flexing test or a twisting test. When the tensile elastic modulus is 2,000 MPa or less, the film can be flexed in the thickness direction with a small curvature radius. The tensile elastic modulus is more preferably from 10 to 1,000 MPa, and further preferably from 20 to 700 MPa, from these points of view.

The lower low elasticity layer 3 imparts further favorable plasticity to the optical waveguide of the present invention in cooperation with the upper low elasticity layer 6.

The tensile yield elongation on the tensile test and the total light transmittance of a cured film of a resin composition for forming the lower low elasticity layer are preferably similar to those of the resin composition for forming the upper low elasticity layer.

The resin composition for forming the upper low elasticity layer and the resin composition for forming the lower low elasticity layer (which are generically referred simply to as "a resin composition for forming a low elasticity layer") are not particularly limited as far as the aforementioned properties are satisfied, and preferably contain a rubber component. Preferred examples of the rubber component include acrylic rubber and acrylonitrile-butadiene rubber.

The resin composition for forming the upper low elasticity layer and the resin composition for forming the lower low elasticity layer may be the same as or different from each other, and are preferably the same as each other from the standpoint of productivity.

The acrylic rubber is rubber that contains an acrylate ester as a major component, and contains a butyl acrylate-acrylonitrile copolymer, an ethyl acrylate-acrylonitrile copolymer or the like.

Examples of the comonomer include butyl (meth) acrylate, ethyl (meth)acrylate, methyl (meth)acrylate, ethyl (meth) acrylate and acrylonitrile.

The acrylonitrile-butadiene rubber is not particularly limited, and known ones may be used solely or as a combination of two or more kinds thereof. The acrylonitrile-butadiene rubber may be obtained by emulsion copolymerization of acrylonitrile and butadiene, and the content of acrylonitrile is preferably in a range of from 5 to 60% by mass, and more preferably in a range of from 15 to 40% by mass. When the content of acrylonitrile is in the range, it is advantageous in compatibility with a (meth)acrylate, an epoxy resin or the like, and in adhesiveness to other resins.

The acrylic rubber and the acrylonitrile-butadiene rubber may be used solely or as a combination of two or more kinds thereof, and the acrylic rubber and the acrylonitrile-butadiene rubber may be used in combination.

The rubber component preferably has a weight average molecular weight of 100,000 or more, more preferably from 100,000 to 3,000,000, further preferably from 300,000 to 3,000,000, and particularly preferably from 500,000 to 2,000,000. When the weight average molecular weight is 100,000 or more, sufficient strength and plasticity can be obtained in the form of a sheet or a film, and the tackiness is not increased. When it is 3,000,000 or less, good compatibility with the other resin components is obtained. The weight average molecular weight in the present invention means a value obtained by measuring with gel permeation chromatography, and converting with the standard polystyrene calibration curve.

The rubber component preferably has a reactive functional group. Preferred examples of the reactive functional group include such functional groups as a carboxyl group, an epoxy group, a hydroxyl group, an episulfide group, an aldehyde group, an epoxy group, an amide group, a vinyl group, an amino group, an isocyanate group and an allyl group. Among these, a carboxyl group is preferred from the standpoint of crosslinking property. The position where the functional group is bonded in the acrylonitrile-butadiene rubber molecules is not particularly limited, and the functional group may be bonded to the end of the main chain or may be bonded to the side chain. In alternative, a copolymer of the rubber component and a monomer containing the reactive functional group may be used.

The upper low elasticity layer and the lower low elasticity layer impart plasticity to the optical waveguide as described above, and in addition, have a function, for example, of imparting flame retardancy to the optical waveguide. For exerting flame retardancy, the resin compositions for forming the upper low elasticity layer and the lower low elasticity layer may contain a phosphorus-containing material, such as a phosphate ester, an aluminum phosphate salt and a polysulfate salt, and an inorganic material, such as a phosphazene compound, a melamine compound, magnesium hydroxide, zinc hydroxide, aluminum hydroxide and zinc molybdate.

For imparting hygrothermal resistance to the optical waveguide, a resin, such as an epoxy resin composition, may be used in the resin compositions for forming the upper low elasticity layer and the lower low elasticity layer.

For preventing cross talk from occurring between two or more cores, a resin composition having large optical loss may be used as the resin compositions for forming the upper low elasticity layer and the lower low elasticity layer.

The production method of the optical waveguide of the present invention will be described. The optical waveguide of the present invention may be produced, for example, in the following manner.

A method of laminating the layers on a substrate, such as silicon, by a spin coating method or the like may be used. More specifically, a composition for forming the lower low elasticity layer is coated depending on necessity on a substrate by a spin coating method or the like, and the lower low elasticity layer is formed by drying, baking and the like. A resin composition for forming the lower cladding layer is coated thereon, and the lower cladding layer is formed by drying, baking and the like. A resin composition for forming the core layer is coated on the lower cladding layer, and the core layer is formed by drying, baking and the like. A mask pattern is then formed with an Si-containing photoresist or the like, and the core pattern is formed by dry etching or the like. Thereafter, the upper cladding layer is formed in the similar manner as in the formation of the lower cladding layer. A resin composition for forming the upper low elasticity layer is coated on the upper cladding layer, and the upper low elasticity layer is formed by drying and, depending on necessity, baking. Finally, the layers are released from the substrate, thereby producing the optical waveguide in the form of a film.

The optical waveguide of the present invention may also be produced in such a manner that one resin film for forming the core layer and two resin films for forming the cladding layers are prepared, and the films are laminated and subjected to exposure and development through a photomask. This method using dry films is favorable from the standpoint that the film thickness is maintained uniform, and the optical waveguide can be produced with high productivity.

The optical waveguide of the present invention has the upper low elasticity layer, which is one of the characteristic features, as described above, and also has the lower low elasticity layer, which is another one of the characteristic features, depending on necessity. As for the upper low elasticity layer and the lower low elasticity layer, the resin film for forming the upper low elasticity layer and/or the resin film for forming the lower low elasticity layer are prepared independently, and the films are laminated with the resin films for forming the cladding layers and the resin film for forming the core layer, thereby producing the optical waveguide, or in alternative, the resin film for forming the upper cladding layer and the resin film for forming the upper low elasticity layer, or the resin film for forming the lower cladding layer and the resin film for forming the lower low elasticity layer are laminated to form a composite film in advance, and the composite films are laminated, thereby producing the optical waveguide. The composite film may be provided by coating the resin composition for forming the upper low elasticity layer on the resin film for forming the upper cladding layer, or by coating the resin composition for forming the lower low elasticity layer on the resin film for forming the lower cladding layer, or alternatively the composite film may be provided by coating the resin composition for forming the upper cladding layer or the resin composition for forming the lower cladding layer on the resin film for forming the low elasticity layer.

The method of laminating the resin film for forming the cladding layer and the resin film for forming the low elasticity layer is not particularly limited, and a method where no air bubble is entrained between the films, such as a roll lamination method and a flat plate lamination method, is preferred.

In the case where the flat plate lamination is employed, the films are preferably laminated under reduced pressure, and the vacuum degree, which is an index of depressurization, is preferably 10,000 Pa or less, and more preferably 1,000 Pa or less. The vacuum degree is preferably lower from the standpoint of adhesiveness and followability, but the lower limit thereof is approximately 10 Pa from the standpoint of productivity (i.e., the period of time required for vacuuming). The heating temperature herein is preferably from 40 to 130° C., and the pressing pressure is preferably approximately from 0.1 to 1.0 MPa (from 1 to 10 kgf/cm$^2$), but these conditions are not particularly limited.

In the case where the composite film containing the resin film for forming the upper cladding layer and the resin film for forming the low elasticity layer is employed, and in the case where protective films are provided on the two kinds of resin films on the side opposite to the substrate supporting film, the protective films are necessarily released off before lamination in both cases.

The resin film for forming the upper cladding layer, the resin film for forming the core layer and the resin film for forming the low elasticity layer (which may be hereinafter referred generically to as "resin films for forming the optical waveguide") may be easily produced in such a manner that the resin composition for forming the cladding layer, the resin composition for forming the core layer or the resin composition for forming the low elasticity layer is dissolved in a solvent and coated on a supporting film, and then the solvent is removed.

The thickness of the resin film for forming the optical waveguide is controlled to provide the thickness of the cladding layer, the core layer or the low elasticity layer.

The supporting film herein is a supporting film that supports the films for forming the optical waveguide, and while the material therefor is not particularly limited, a polymer film used as the substrate may be preferably used.

Preferred examples of the supporting film for the resin film for forming the core layer include polyester, such as polyethylene terephthalate, polypropylene and polyethylene, from the standpoint that the resin film for forming the core layer is easily released later, and the materials have heat resistance and the solvent resistance.

The thickness of the supporting film may be appropriately changed depending on the target plasticity or the like, and is preferably from 5 to 250 µm. When the thickness is 5 µm or more, the strength as the supporting film can be advantageously obtained easily, and when it is 250 µm or less, sufficient plasticity is obtained.

The thickness is of the supporting film for the resin film for forming the core layer is more preferably 50 µm or less from the standpoint that the gap with respect to the mask upon forming the pattern is decreased to form a finer pattern. The thickness of the supporting film is more preferably from 10 to 40 µm, and particularly preferably from 15 to 30 µm, from these points of view.

The solvent used in the production process of the resin films for forming the optical waveguide is not particularly limited as far as the solvent dissolves the resin compositions, and examples thereof include such solvents as acetone, methyl ethyl ketone, methyl cellosolve, ethyl cellosolve, toluene, N, N-dimethylformamide, N, N-dimethylacetamide, propylene glycol monomethyl ether, propylene glycol monomethyl ether acetate, cyclohexanone and N-methyl-2-pyrrolidone, and mixed solvents thereof. The solid concentration in the resin solution is generally preferably approximately from 30 to 80% by mass.

A protective film may be attached depending on necessity to the films for forming the optical waveguide in view of protection of the resin films for forming the optical waveguide, the winding property thereof upon producing in the form of a roll, and the like.

The protective film may be the similar material as the supporting film, and may be subjected to a releasing treatment and an antistatic treatment depending on necessity.

The production of the optical waveguide using dry films will be described with reference to process steps. FIG. 1 shows an embodiment that has the lower low elasticity layer, and FIG. 2 shows an embodiment that does not have the lower low elasticity layer.

In the first step of the production process of the optical waveguide of the present invention, the resin for forming the lower cladding layer provided on the substrate is cured to form the lower cladding layer. The material for the substrate 2 has been described above.

Figure 2:
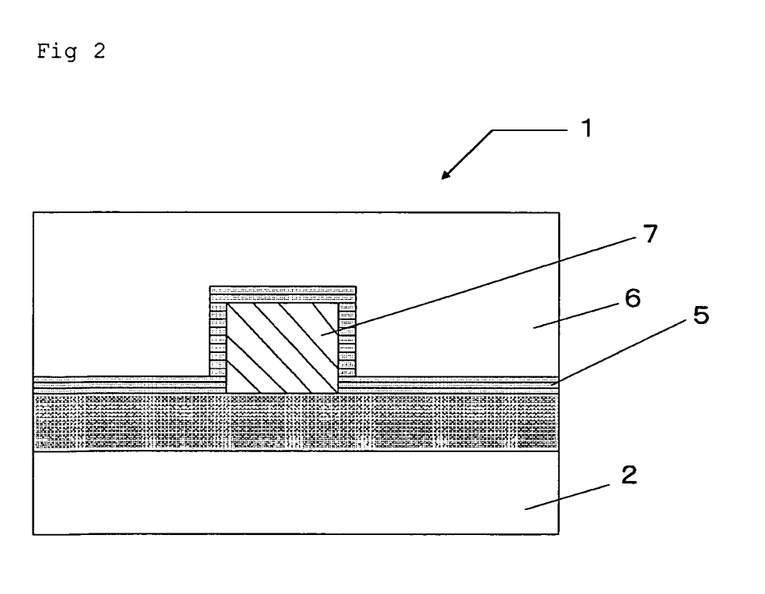
FIG. 2 The figure is a schematic illustration showing another embodiment of an optical waveguide according to the present invention.

In the case where a film is used as the substrate 2 shown in FIG. 2, the resin film for forming the cladding layer produced in advance may be used as it is. Specifically, the resin for forming the lower cladding layer of the resin film for forming the lower cladding layer, which is constituted by the supporting film 2 as the substrate and the resin for forming the cladding layer, is cured to form the cladding layer 4. The surface of the cladding layer 4 is preferably flat. The substrate may be released off later.

In the case where a protective film is provided on the side of the resin film for forming the lower cladding layer opposite to the supporting film 2, the resin film for forming the lower cladding layer is cured with light or heat, and the protective film is released off before or after the curing, thereby forming the lower cladding layer 4. In the case where the supporting film 2 is used as the substrate, the resin for forming the lower cladding layer is preferably formed into the film form on the supporting film 2 that has been subjected to an adhesion treatment. According to the procedures, the adhesion force between the lower cladding layer 4 and the substrate 2 is enhanced, thereby preventing failure due to peel-off between the lower cladding layer 4 and the substrate 2.

The adhesion treatment herein is a treatment that enhances the adhesion force between the supporting film and the resin of the cladding layer formed thereon by an adhesion facilitating resin coating, a corona treatment, a matting treatment, such as sand blasting, or the like.

The protective film is preferably not subjected to an adhesion treatment for facilitating release from the resin film for forming the cladding layer, and may be subjected to a releasing treatment depending on necessity. In the case where a substrate other than the supporting film is used as the substrate 2, and in the case where the substrate 2 has a protective layer for the resin film for forming the cladding layer, the resin is transferred to the substrate 2 by a laminating method using a roll laminator or the like after releasing the protective layer, and then the supporting film is released off. Subsequently, the resin for forming the cladding layer is cured with light or heat to form the cladding layer 4.

In alternative, the resin for forming the cladding layer may be formed into a film on a supporting film having not been subjected to an adhesion treatment, and then transferred to the substrate 2 by a laminating method or the like.

Furthermore, a multi-layer optical waveguide having multiple sets of the upper cladding, lower cladding and core layers may be produced on one surface or both surfaces of the substrate 2.

A composite film having the lower low elasticity layer and the lower cladding layer laminated on the substrate or a laminated product of the resin film for forming the lower low elasticity layer and the resin film for forming the lower cladding layer may be used herein to produce the optical waveguide of the embodiment shown in FIG. 1.

An electric circuit may be provided on the substrate 2, and in this case, a substrate 2 having an electric circuit provided in advance may be used. In alternative, after producing the multi-layer optical waveguide, an electric circuit may be formed on the substrate 2. According to the procedures, both the signal transmission line of the metallic circuit and the signal transmission line of the optical waveguide are provided on the substrate 2 and can be appropriately selected and used to facilitate high-speed and long-distance signal transmission.

In the second step, the resin for forming the core layer is laminated on the lower cladding layer 4 to form the core layer. In this case, it is also preferred to use the resin film for forming the core layer upon laminating the resin for forming the core layer. More specifically, the resin film for forming the core layer is press bonded onto the lower cladding layer 4 by using a roll laminator to form the core layer. The roll may be heated upon press bonding, and the temperature is preferably in a range of from room temperature to 100° C. When the temperature exceeds 100° C., the core layer flows upon roll lamination, thereby failing to provide the necessary thickness. The pressure is preferably from 0.2 to 0.9 MPa. The lamination speed is preferably from 0.1 to 3 m/min, but these conditions are not particularly limited.

Subsequently, the film having the core layer laminated on the lower cladding layer 4 is press bonded under heat by flat plate lamination. The lamination is preferably performed under reduced pressure from the standpoint of adhesiveness and followability. The vacuum degree as an index of reduced pressure is preferably 10,000 Pa or less, and more preferably 1,000 Pa or less.

The vacuum degree is preferably lower from the standpoint of adhesiveness and followability, but the lower limit thereof is approximately 10 Pa from the standpoint of productivity (i.e., the period of time required for vacuuming). The heating temperature herein is preferably from 40 to 130° C., and the pressing pressure is preferably approximately from 0.1 to 1.0 MPa (from 1 to 10 kgf/cm$^2$), but these conditions are not particularly limited. The resin film for forming the core layer is preferably constituted by the resin for the core layer and the supporting film from the standpoint of handleability, and may be constituted by the resin for the core layer solely.

In the case where a protective film is provided on the side of the resin film for forming the core layer opposite to the substrate, the resin film for forming the core layer is laminated after releasing the protective film. In this case, the protective film and the supporting film are preferably not subjected to an adhesion treatment for facilitating release from the resin film for forming the core layer, and may be subjected to a releasing treatment depending on necessity.

In the third step, the core layer is exposed and developed to form the core pattern 7 of the optical waveguide. Specifically, active light is radiated imagewise through a photomask pattern. Examples of the light source of the active light include known light sources that radiate effectively an ultraviolet ray, such as a carbon arc lamp, a mercury vapor arc lamp, a super-high-pressure mercury lamp, high-pressure mercury lamp and a xenon lamp. In addition, light sources that radiate effectively a visible ray, such as a photographic flood lamp and a sun lamp, may be used.

Subsequently, the supporting film of the resin film for forming the core layer is removed in the case where the supporting film still remains, and the non-exposed part is removed by wet development or the like to develop thereby forming the core pattern 7. In the case of wet development, the core layer is developed by a known method, such as spraying, immersion with vibration, brushing or scrubbing, by using an organic solvent developer, an alkaline aqueous solution, an alkaline aqueous developer containing an alkaline aqueous solution and at least one organic solvent, or the like. The developing temperature is controlled according to the developing property of the resin layer for forming the core part.

Examples of the organic solvent developer include N-methylpyrrolidone, N,N-dimethylformamide, N,N-dimethylacetamide, cyclohexanone, methyl ethyl ketone, methyl isobutyl ketone, γ-butyrolactone, methyl cellosolve, ethyl cellosolve, propylene glycol monomethyl ether and propylene glycol monomethyl ether acetate. Two or more kinds of developing methods may be used in combination depending on necessity.

The base of the alkaline aqueous solution is not particularly limited, and examples thereof include an alkali metal hydroxide, such as lithium hydroxide, sodium hydroxide and potassium hydroxide; an alkali metal carbonate salt, such as lithium carbonate, sodium carbonate and potassium carbonate; an alkali metal hydrogen carbonate, such as lithium hydrogen carbonate, sodium hydrogen carbonate and potassium hydrogen carbonate; an alkali metal phosphate salt, such as potassium phosphate and sodium phosphate; an alkali metal pyrophosphate, such as sodium pyrophosphate and potassium pyrophosphate; a sodium salt, such as sodium tetraborate and sodium metasilicate; an ammonium salt, such as ammonium carbonate and ammonium hydrogen carbonate; and an organic base, such as tetramethylammonium hydroxide, triethanolamine, ethylenediamine, diethylenetriamine, 2-amino-2-hydroxymethyl-1,3-propanediol and 1,3-diaminopropanol-2-morpholine.

These bases may be used solely or as a combination of two or more kinds thereof.

The alkali aqueous solution used for development preferably has pH of from 9 to 14. The alkali aqueous solution may contain a surfactant, a defoaming agent and the like.

The alkaline quasi-aqueous developer is not particularly limited as far as it contains an alkaline aqueous solution and at least one of the aforementioned organic solvents. The pH of the alkaline quasi-aqueous developer is preferably as small as possible within the range where the development is performed sufficiently, and is preferably from 8 to 13, and more preferably from 9 to 12.

The concentration of the organic solvent is generally preferably from 2 to 90% by mass. The alkaline quasi-aqueous developer may contain a surfactant, a defoaming agent and the like in a small amount.

Examples of the method for development include a dipping method, a paddling method, a spraying method, such as a high-pressure spraying method, brushing and scrubbing, and a high-pressure spraying method is most suitable for enhancing the resolution.

As a post-treatment after the development, the core pattern 7 may be further cured by heating to approximately from 60 to 250° C. or exposing to approximately from 0.1 to 1,000 mJ/cm² depending on necessity before use.

Thereafter, the fourth step is performed, in which the upper cladding layer is disposed around the core pattern 7, and the upper low elasticity layer is further formed thereon, and examples of the method therefor include a method of laminating the resin film for forming the upper cladding layer and the resin film for forming the upper low elasticity layer in this order, and a method of laminating a composite film containing the resin film for forming the upper cladding layer and the resin film for forming the upper low elasticity layer having been laminated in advance, in such a manner that the upper cladding layer is in contact with the core pattern. In the present invention, the method for preparing the composite film in advance is advantageous since excellent adhesiveness and followability can be obtained between the core pattern and the lower cladding layer upon lamination of the upper cladding layer.

The protective film and the supporting film of the resin film for forming the upper cladding layer and the resin film for forming the low elasticity layer are preferably not subjected to an adhesion treatment for facilitating release from the resin film for forming the upper cladding layer, and may be subjected to a releasing treatment depending on necessity. The protective film preferably has higher releasing property than the supporting film.

In the case where the composite film is laminated after removing the supporting film on the side of the resin film for forming the upper cladding layer, in such a manner that the resin film for forming the upper cladding layer is directed to the core pattern, the lamination is preferably performed by a flat plate lamination method under reduced pressure from the standpoint of adhesiveness and followability. The vacuum degree, which is an index of depressurization, is preferably 10,000 Pa or less, and more preferably 1,000 Pa or less.

The vacuum degree is preferably lower from the standpoint of adhesiveness and followability, but the lower limit thereof is approximately 10 Pa from the standpoint of productivity (i.e., the period of time required for vacuuming). The heating temperature herein is preferably from 40 to 130° C., and the pressing pressure is preferably approximately from 0.1 to 1.0 MPa (from 1 to 10 kgf/cm²), but these conditions are not particularly limited.

In the fifth step, the upper cladding layer and the low elasticity layer are cured with light and heat. The curing is performed with active light in the same manner as described above. Examples of the light source of the active light include known light sources that radiate effectively an ultraviolet ray, such as a carbon arc lamp, a mercury vapor arc lamp, a super-high-pressure mercury lamp, high-pressure mercury lamp and a xenon lamp. In addition, light sources that radiate effectively a visible ray, such as a photographic flood lamp and a sun lamp, may be used. The active light source preferably radiates diffused light without directionality.

EXAMPLE

The present invention will be described more specifically with reference to examples below, but the present invention is not limited to the examples.

Evaluation Methods

1. Optical Transmission Loss

An optical waveguide (waveguide length: 10 cm) obtained in Example was measured for optical transmission loss with VCSEL (FLS-300-01-VCL, produced by EXFO, Inc.), a light receiving sensor (Q82214, produced by Advantest Corporation), an incoming fiber (GI-50/125 multimode fiber, NA=0.20) and an outgoing fiber (SI-114/125 multimode fiber, NA=0.22) according to a cutback method (measured waveguide length: 10, 5, 3 and 2 cm).

2. Flexural Durability Test

An optical waveguide (waveguide length: 10 cm) obtained in Example was subjected to a flexural durability test in such a manner that the flexural durability test was performed under conditions of a flexing angle of from 0 to 180°, a flexing radius of 2 mm and flexing speed of 2 times per second with a flexural durability tester (produced by Daisho Denshi Co., Ltd.), and the presence of breakage of the cured film was observed.

Production Example 1

Production of Resin Film for Forming Core Layer and Resin Film for Forming Lower Cladding Layer Resin compositions for forming the core layer and the cladding layer having the formulations shown in Table 1 were prepared, to which 40 parts by mass of ethyl cellosolve as a solvent was added per 100 parts by mass of the components other than the solvent, thereby preparing resin varnishes for forming the core layer and the cladding layer. In the formulations shown in Table 1, the mixed amounts of the base polymer (A) and the photopolymerizable compound (B) are in terms of percent by mass based on the total amount of the components (A) and (B), and the mixed amount of the photopolymerization initiator (C) is in terms of proportion (part by mass) per 100 parts by mass of the total of the components (A) and (B).

TABLE 1

|  | (A) Base Polymer | (B) Photopolymerizable Compound | (C) Polymerization Initiator |
|---|---|---|---|
| Core | Phenotohto YP-70 *[1] (20 parts by mass) | A-BPEF *[2] (39 parts by mass) EA-1020 *[3] (39 parts by mass) | 2,2-bis(2-chlorophenyl)-4,4', 5,5'-tetraphenyl-1,2'-biimidazole *[5] (1 part by mass) 4,4'-bis(diethylamino)-benzophenone *[6] (0.5 part by mass) 2-mercaptobenzimidazole *[7] (0.5 part by mass) |

TABLE 1-continued

|  | (A) Base Polymer | (B) Photopolymerizable Compound | (C) Polymerization Initiator |
|---|---|---|---|
| Cladding | PhenotohtoYP-70 *1 (35 parts by mass) | KRM-2110 *4 (63 parts by mass) | SP-170 *8 (2 parts by mass) |

*1 Phenotohto YP-70, produced by Tohto Kasei Co., Ltd., a bisphenol A-bisphenol F copolymer type phenoxy resin
*2 A-BPEF, produced by Shin-Nakamura Chemical Co., Ltd., 9,9-bis(4-(2-acryloyloxyethoxy)phenyl)fluorene
*3 EA-1020, produced by Shin-Nakamura Chemical Co., Ltd., bisphenol A type epoxy acrylate
*4 KRM-2110, produced by Shin-Nakamura Chemical Co., Ltd., alicyclic diepoxy carboxylate
*5 2,2-bis(2-chlorophenyl)-4,4',5,5'-tetraphenyl-1,2'-biimidazole, produced by Tokyo Kasei Kogyo Co., Ltd.
*6 4,4'-bis(diethylamino)benzophenone, produced by Tokyo Kasei Kogyo Co., Ltd.
*7 2-mercaptobenzimidazole, produced by Tokyo Kasei Kogyo Co., Ltd.
*8 SP-170, produced by ADEKA Corporation, triphenylsulfonium hexafluoroantimonate salt The resulting resin varnishes for forming the core layer and the lower cladding layer each were coated on a PET film ("Cosmoshine A1517, produced by Toyobo Co., Ltd., thickness: 16 μm) with an applicator ("YBA-4", produced by Yoshimitsu Seiki Co., Ltd.) (resin film for forming cladding layer: adhesion-treated inner surface of roll used, resin film for forming core layer: non-adhesion-treated outer surface of roll used), and the solvent was dried at 80° C. for 10 minutes and then at 100° C. for 10 minutes, thereby providing resin films for forming the core layer and the cladding layer. The thickness of the films herein can be arbitrarily controlled within a range of from 5 to 100 μm by changing the gap of the applicator. In the production example, it was controlled to provide, for the resin film for forming the core layer, a resin film providing a thickness of the core layer after curing of 40 μm, and for the resin film for forming the lower cladding layer, a resin film providing a thickness of the lower cladding layer after curing of 20 μm (hereinafter referred to as "a resin film A for forming the lower cladding layer"), and a resin film providing a thickness of the lower cladding layer after curing of 10 μm (hereinafter referred to as "a resin film B for forming the lower cladding layer").

Production Example 2

Production of Resin Film for Forming Upper Cladding Layer

A resin varnish that was the same as the resin varnish for forming the lower cladding layer in Production Example 1 was used as a resin varnish for forming the upper cladding layer, and was coated on a PET film ("Purex A53", a trade name, produced by Teijin, Ltd., thickness: 25 μm) with an applicator ("YBA-4", produced by Yoshimitsu Seiki Co., Ltd.) (treated inner surface of roll used), and the solvent was dried under the same conditions as in the formation of the lower cladding layer, thereby providing a resin film for forming the upper cladding layer. The thickness of the film herein can be arbitrarily controlled within a range of from 5 to 100 μm by changing the gap of the applicator. In the production example, it was controlled to provide a thickness after curing of 10 μm.

A film having a thickness after curing of 110 μm was produced by changing the gap of the applicator, and the film was irradiated with an ultraviolet ray (wavelength: 365 nm) to 4,000 mJ/cm$^2$ with an ultraviolet ray exposer (MAP-1200, produced by Dainippon Screen Mfg. Co., Ltd.) and then heat-treated at 160° C. for one our, thereby providing a cured film for characterization test. The total light transmittance of the cured film measured was 94%.

Production Example 3

Production of Resin Film for Forming Low Elasticity Layer

As a resin composition for forming the low elasticity layer, 60 parts by mass of "DN631", produced by Nippon Zeon Corporation, 12.25 parts by mass of "YD-8125", produced by Tohto Kasei Co., Ltd., 7.75 parts by mass of "LF-4871", produced by Dainippon Ink And Chemicals, Inc., 20 parts by mass of "TMP-A", produced by Kyoeisha Chemical Co., Ltd., 0.3 part by mass of "2PZ-CN", produced by Shikoku Chemicals Corporation, 1.0 part by mass of "Irgacure 2959", produced by Ciba Specialty Chemicals Co., Ltd., and 1.0 part by mass of "Irgacure 819", produced by Ciba Specialty Chemicals Co., Ltd. were prepared, to which 40 parts by mass of cyclohexanone as a solvent is added, thereby providing a resin varnish for forming the low elasticity layer.

The resulting resin varnish for forming the low elasticity layer was coated on a PET film ("Purex A53", a trade name, produced by Teijin, Ltd., thickness: 25 μm) with an applicator ("YBA-4", produced by Yoshimitsu Seiki Co., Ltd.) (non-treated outer surface of roll used), and the solvent was dried at 80° C. for 10 minutes and then at 100° C. for 10 minutes, thereby providing a resin film for forming the low elasticity layer. The thickness of the film herein can be arbitrarily controlled within a range of from 5 to 100 μm by changing the gap of the applicator. In the production example, it was controlled to provide a thickness after curing of 70 μm (hereinafter referred to as "a resin film A for forming the low elasticity layer").

A film for characterization test having a thickness after curing of 110 μm was produced by changing the gap of the applicator, and after laminating a PET film, the film was irradiated with an ultraviolet ray (wavelength: 365 nm) to 4,000 mJ/cm$^2$ with an ultraviolet ray exposer (MAP-1200, produced by Dainippon Screen Mfg. Co., Ltd.) and then heat-treated at 160° C. for one our, thereby providing a cured film. The elastic modulus thereof measured was 60 MPa. The total light transmittance thereof was 84%.

Production Example 4

Production of Resin Film for Forming Low Elasticity Layer

A resin film for forming the low elasticity layer was provided in the same manner as in Production Example 3 except that the amount of "YD-8125" in Production Example 3, was changed to 23.7 parts by mass, the amount of "LF-4871" was changed to 16.3 parts by mass, and "TMP-A", "Irgacure 2959" and "Irgacure 819" in Production Example 3 were not used (hereinafter referred to as "a resin film B for forming the low elasticity layer"). A cured film having a thickness of 110 µm obtained in the same manner as in Production Example had an elastic modulus of 110 MPa and a total light transmittance of 65%.

Production Example 5

Production of Composite Film

The resin film for forming the upper cladding layer obtained in Production Example 2 and the resin film A for forming the low elasticity layer obtained in Production Example 3 were laminated with a roll laminator (HLM-1500, produced by Hitachi Chemical Co., Ltd.) under conditions of a pressure of 0.4 MPa, a temperature of 50° C. and a lamination speed of 0.2 m/min, and the PET film on the side of the upper cladding layer was removed, thereby providing a composite film (hereinafter referred to as "a composite film A").

Production Example 6

Production of Composite Film

A composite film was obtained in the same manner as in Production Example 5 except that the resin film B for forming the low elasticity layer obtained in Production Example 4 was used instead of the resin film A for forming the low elasticity layer obtained in Production Example 3 used in Production Example 5 (hereinafter referred to as "a composite film B").

Production Example 7

Production of Composite Film

The resin film B for forming the lower cladding layer obtained in Production Example 1 and the resin film A for forming the low elasticity layer obtained in Production Example 3 were laminated with a roll laminator (HLM-1500, produced by Hitachi Chemical Co., Ltd.) under conditions of a pressure of 0.4 MPa, a temperature of 50° C. and a lamination speed of 0.2 m/min, thereby providing a composite film (hereinafter referred to as "a composite film C").

Example 1

Production of Optical Waveguide

The resin film A for forming the lower cladding layer obtained in Production Example 1 was photo-cured through irradiation with an ultraviolet ray (wavelength: 365 nm) to 1,000 mJ/cm$^2$ with an ultraviolet ray exposer (MAP-1200, produced by Dainippon Screen Mfg. Co., Ltd.), thereby forming the lower cladding layer 3.

The resin film for forming the core layer obtained in Production Example 1 was then laminated on the lower cladding layer with a roll laminator (HLM-1500, produced by Hitachi Chemical Co., Ltd.) under conditions of a pressure of 0.4 MPa, a temperature of 50° C. and a lamination speed of 0.2 m/min.

Subsequently, the resin film was irradiated with an ultraviolet ray (wavelength: 365 nm) to 1,000 mJ/cm$^2$ with the ultraviolet ray exposer through a photomask with a width of 40 µm (negative type), and the core pattern was developed with a mixed solvent of ethyl cellosolve and N,N-dimethylacetamide mixed at a mass ratio of 8/2. The developer was washed away with methanol and water.

The composite film A obtained in Production Example 5 was laminated to make the side of the resin film for forming the upper cladding layer in contact with the core pattern and the lower cladding layer with a vacuum pressurizing laminator (MVLP-500, produced by Meiki Co., Ltd.), after vacuuming to 500 Pa or less, under lamination conditions of a pressure of 0.4 MPa, a temperature of 70° C. and a pressurizing time of 30 seconds. Thereafter, the films were irradiated with an ultraviolet ray (wavelength: 365 nm) to 4,000 mJ/cm$^2$ with the ultraviolet ray exposer, and then heat-treated at 160° C., thereby forming the upper cladding layer 5 and the upper low elasticity layer 6, and thus an optical waveguide was produced.

The refractive indices of the core layer and the cladding layer measured with a prism coupler, produced by Metricon Corporation (Model 2010) were 1.584 for the core layer and 1.537 for the cladding layer, at a wavelength of 850 nm, and the relative refractive index difference was 2.7%.

The evaluation by the aforementioned evaluation methods revealed that the light transmission loss was 0.07 dB/cm, and the optical waveguide was not broken after flexing 100,000 times in the flexural durability test.

Example 2

Production of Optical Waveguide

An optical waveguide was produced in the same manner as in Example 1 except that the composite film B obtained in Production Example 6 was used instead of the composite film A obtained in Production Example 5 used in Example 1.

The evaluation by the aforementioned evaluation methods revealed that the light transmission loss was 0.07 dB/cm, and the optical waveguide was not broken after flexing 100,000 times in the flexural durability test.

Example 3

Production of Optical Waveguide

The composite film C obtained in Production Example 7 was irradiated with an ultraviolet ray (wavelength: 365 nm) to 1,000 mJ/cm$^2$ with an ultraviolet ray exposer (MAP-1200, produced by Dainippon Screen Mfg. Co., Ltd.), thereby photo-curing the resin film for forming the lower cladding layer, and thus the lower cladding layer 4 and the lower low elasticity layer 3 were produced.

The PET film as the supporting substrate of the lower cladding layer 3 was released off, and the resin film for forming the core layer obtained in Production Example 1 was laminated on the lower cladding layer with a roll laminator (HLM-1500, produced by Hitachi Chemical Co., Ltd.) under conditions of a pressure of 0.4 MPa, a temperature of 50° C. and a lamination speed of 0.2 m/min.

Thereafter, the core pattern was produced in the same manner as in Example 1, and then the upper cladding layer 5 and the upper low elasticity layer 6 were formed by using the composite film A obtained in Production Example 5 in the same manner as in Example 1, thereby producing an optical waveguide.

The evaluation by the aforementioned evaluation methods revealed that the light transmission loss was 0.06 dB/cm, and the optical waveguide was not broken after flexing 100,000 times in the flexural durability test.

Comparative Example 1

Production of Optical Waveguide

An optical waveguide was produced in the same manner as in Example 1 except that the resin film A for forming the low elasticity layer obtained in Production Example 3 was used instead of the composite film A in Example 1.

The evaluation by the aforementioned evaluation methods revealed that the optical waveguide was not broken after flexing 100,000 times in the flexural durability test, but the light transmission loss was 0.39 dB/cm.

INDUSTRIAL APPLICABILITY

According to the present invention, an optical waveguide that has high flexural resistance and is excellent in optical characteristics can be provided.

The invention claimed is:

1. An optical waveguide comprising a lower cladding layer, a patterned core layer having peripheral surfaces and a thickness from 30 to 70 μm, an upper cladding layer having portions disposed to surround the peripheral surfaces of the patterned core layer and having an average thickness of 3 to 20 μm, and an upper low elasticity layer, which are laminated in this order, wherein a film formed by curing a resin composition for forming the upper low elasticity layer has a tensile elastic modulus of from 1 to 2,000 MPa at 25° C., and wherein the upper cladding layer is formed from a resin composition that has a total light transmittance of 90% or more when cured to form a film having a thickness of 110 μm.

2. The optical waveguide according to claim 1, wherein the optical waveguide further comprises a lower low elasticity layer, wherein the lower low elasticity layer, the lower cladding layer, the patterned core layer, the upper cladding layer and the upper low elasticity layer are laminated in this order, and wherein a film formed by curing a resin composition for forming the lower low elasticity layer has a tensile elastic modulus of from 1 to 2,000 MPa at 25° C.

3. The optical waveguide according to claim 1, wherein the optical waveguide has a relative refractive index difference between the core layer and the cladding layer of from 1 to 10%.

4. The optical waveguide according to claim 1, wherein a film formed by curing a resin composition for forming the upper low elasticity layer has a tensile yield elongation of from 5 to 600% at 25° C.

5. The optical waveguide according to claim 1, wherein the resin composition for forming the upper low elasticity layer contains a rubber component.

6. The optical waveguide according to claim 5, wherein the rubber component is acrylic rubber and/or acrylonitrile-butadiene rubber.

7. The optical waveguide according to claim 1, wherein the upper low elasticity layer has an average thickness of from 5 to 100 μm.

8. The optical waveguide according to claim 2, wherein the lower low elasticity layer has an average thickness of from 5 to 100 μm.

9. The optical waveguide according to claim 1, wherein the portions of the upper cladding layer disposed to surround the peripheral surfaces of the patterned core layer are embedded in the upper low elasticity layer.

10. An optical waveguide, comprising:
a lower cladding layer;
a patterned core layer above the lower cladding layer, the patterned core layer having peripheral surfaces;
an upper cladding layer above the lower cladding layer, the upper cladding layer having portions disposed upon the peripheral surfaces of the patterned core layer, and the upper cladding layer formed from a resin composition that has a total light transmittance of 90% or more when cured to form a film having a thickness of 110 μm; and
an upper low elasticity layer in which the portions of the upper cladding layer disposed upon the peripheral surfaces of the patterned core layer are embedded, wherein a film formed by curing a resin composition for forming the upper low elasticity layer has a tensile elastic modulus of from 1 to 2,000 MPa at 25° C.

11. The optical waveguide according to claim 10, wherein the patterned core layer has a thickness and the upper cladding layer has a thickness less than the thickness of the core layer.

12. The optical wave guide according to claim 11, wherein the patterned core layer has a thickness of 30 to 70 μm, and wherein the upper cladding layer has an average thickness of 3 to 20 μm.

13. The optical waveguide according to claim 10, wherein the optical waveguide further comprises, a lower low elasticity layer below the lower cladding layer, wherein a film formed by curing a resin composition for forming the lower low elasticity layer has a tensile elastic modulus of from 1 to 2,000 MPa at 25° C.

14. The optical waveguide according to claim 10, wherein the optical waveguide has a relative refractive index difference between the core layer and the cladding layer of from 1 to 10%.

15. The optical waveguide according to claim 10, wherein a film formed by curing a resin composition for forming the upper low elasticity layer has a tensile yield elongation of from 5 to 600% at 25° C.

16. The optical waveguide according to claim 10, wherein the resin composition for forming the upper low elasticity layer contains a rubber component.

17. The optical waveguide according to claim 16, wherein the rubber component is acrylic rubber and/or acrylonitrile-butadiene rubber.

18. The optical waveguide according to claim 10, wherein the upper low elasticity layer has an average thickness of from 5 to 100 μm.

19. The optical waveguide according to claim 13, wherein the lower low elasticity layer has an average thickness of from 5 to 100 μm.

* * * * *